US008245091B2

(12) United States Patent
Chen et al.

(10) Patent No.: US 8,245,091 B2
(45) Date of Patent: Aug. 14, 2012

(54) METHODS AND DEVICES FOR GENERATING DOTS OF AN IMAGE BY USING TWO ERROR ROW MEMORIES

(75) Inventors: Feng Chen, Beijing (CN); Wei Zhu, Beijing (CN); Zhihong Liu, Beijing (CN)

(73) Assignees: Peking University Founder Group Co., Ltd., Beijing (CN); Beijing Founder Electronics Co., Ltd., Beijing (CN); Peking University, Beijing (CN)

( * ) Notice: Subject to any disclaimer, the term of this patent is extended or adjusted under 35 U.S.C. 154(b) by 344 days.

(21) Appl. No.: 12/513,975

(22) PCT Filed: Nov. 5, 2007

(86) PCT No.: PCT/CN2007/003125
§ 371 (c)(1),
(2), (4) Date: Dec. 28, 2009

(87) PCT Pub. No.: WO2008/055411
PCT Pub. Date: May 15, 2008

(65) Prior Publication Data
US 2010/0115356 A1    May 6, 2010

(30) Foreign Application Priority Data

Nov. 7, 2006 (CN) .......................... 2006 1 0114331

(51) Int. Cl.
*G06F 11/30* (2006.01)
*G08C 25/00* (2006.01)
*H03M 13/00* (2006.01)

(52) U.S. Cl. ....................................... 714/746; 711/154

(58) Field of Classification Search .................. 714/746; 711/154
See application file for complete search history.

(56) References Cited

U.S. PATENT DOCUMENTS
5,937,146 A * 8/1999 Tateno et al. .................. 358/1.9

FOREIGN PATENT DOCUMENTS
| CN | 1393093 A | 1/2003 |
| CN | 1668062 A | 9/2005 |
| CN | 1964423 A | 5/2007 |

\* cited by examiner

*Primary Examiner* — Guy Lamarre
(74) *Attorney, Agent, or Firm* — Lowe Hauptman Ham & Berner LLP

(57) ABSTRACT

Disclosed are devices and methods for generating dots of an image by using two error row memories, which are capable of reading and writing data synchronously. A device disclosed comprises: a buffer memory A; a buffer memory B; and a memory controller. The memory controller may comprise a read-write control circuit for the buffer memory A, a read-write control circuit for the buffer memory B, and a buffer memory selection circuit. The buffer memory selection circuit is used to generate a read-write selection signal for the buffer memory A and the buffer memory B. The read-write control circuit for the buffer memory A is connected to the buffer memory A and used to implement a read operation or a write operation on the buffer memory A according to the read-write selection signal. The read-write control circuit for the buffer memory B is connected to the buffer memory B and used to implement a read operation or a write operation on the buffer memory B according to the read-write selection signal. The devices and methods are capable of implementing read and write operations on memories synchronously, which can improve the speed of error diffusion during use.

7 Claims, 8 Drawing Sheets

| $E_{i,j-2}D1$ | $E_{i,j-1}D1$ | $E_{i,j}D1$ |
| --- | --- | --- |
| $E_{i,j-2}D2$ | $E_{i,j-1}D2$ | $E_{i,j}D2$ |
| $E_{i,j-2}D3$ | $E_{i,j-1}D3$ | $E_{i,j}D3$ |
| | | $E_{i,j}D4$ |

METHODS AND DEVICES FOR GENERATING DOTS OF AN IMAGE BY USING TWO ERROR ROW MEMORIES

FIELD OF THE INVENTION

The present invention relates to methods and devices for generating dots of an image, more particularly, to methods and devices for generating dots of an image by using two buffer memories so as to read and write data in parallel.

BACKGROUND OF THE INVENTION

The digital halftone technique in the field of image processing can convert a continuous tone image to a binary tone image. Recently, an Error Diffusion method based on the digital halftone technique is used widely. According to the Error Diffusion method, when a gray value of each pixel in an original image is compared with a threshold to generate a dot, an error between the gray value of the pixel and the threshold is diffused to pixels adjacent to the pixel. For example, in an image with 256 gray levels, the threshold is set as 127. After comparing, a pixel whose gray value is 150 will be converted to a white dot (the gray value of a white dot is 255). However, this dot should not be purely white. A difference between the gray values of the dot and a white dot is equal to 105. In this case, the error value 105 is diffused to adjacent dots around the dot by a certain means.

In many algorithms for diffusing errors to adjacent pixels, Floyd-Steinberg Algorithm is a common algorithm for Error Diffusion method. By using the Floyd-Steinberg Algorithm, the error of a pixel is diffused to four adjacent pixels. According to the Floyd-Steinberg Algorithm, after the gray value of the current pixel is compared with a threshold, the gray value of the pixel is set as 1 or 0 (i.e. the corresponding dot is set as a black or white dot). Then, the error is obtained by calculation and distributed to adjacent pixels to adjust the gray values of the adjacent pixels. FIG. 1A is a diagram illustrating error diffusion and distribution based on the Floyd-Steinberg Algorithm. Based on the Floyd-Steinberg Algorithm, the error of a current pixel * is distributed to four pixels adjacent to the current pixel according to the ratios shown in FIG. 1A. Specifically, 7/16 of the error value is added to a pixel adjacent to and on the right side of the current pixel, 5/16 of the error value is added to a pixel in the next row, which corresponds to the current pixel, 3/16 of the error value is added to a pixel, which is adjacent to and on the left side of the pixel in the next row corresponding to the current pixel, and 1/16 of the error value is added to a pixel, which is adjacent to and on the right side of the pixel in the next row corresponding to the current pixel. This process is implemented to each pixel in the image for halftoning and revising the gray values.

Theoretically, the gradations and the colors of the original image can be reflected well by using the Error Diffusion method. More pixels involved in the error diffusion of a pixel will result in a better effect. Some improved algorithms such as Stucki Algorithm have arisen on the basis of the Floyd-Steinberg Algorithm. FIG. 2 illustrates error diffusion and distribution based on the Stucki Algorithm. Based on the Stucki Algorithm, the error of a current pixel * is distributed to twelve pixels adjacent to the current pixel, as shown in FIG. 2. In general, some of these twelve positions have the same error distribution ratio. It only needs five different error distribution ratios, wherein D1=1/44, D2=2/44, D3=5/44, D4=4/44, and D5=8/44. The output image has a better effect because more pixels are related to according to the Stucki Algorithm.

In the processing of an image, more pixels involved in the error diffusion of a pixel will result in more calculation and slower processing speed. In the devices for generating frequency modulation dots in a high speed using a hardware circuit, the speed of reading and writing the memory impacts speed of generating the frequency modulation dots significantly. According to the conventional Error Diffusion method, large numbers of read-write operations on the memory arise, which restricts the use of the Error Diffusion method.

Although many researches have been practiced for improving the speed of generating frequency modulation dots, it still need implement at least one read operation and at least one write operation on the memory for one pixel during the error diffusion and the read operation and the write operation are implemented separately, which impacts the speed of generating dots significantly.

SUMMARY OF THE INVENTION

According to an aspect of the present invention, a device for generating dots of an image by using two error row memories is provided, which is capable of reading and writing data synchronously and comprises: a first buffer memory; a second buffer memory; and a memory controller. The memory controller may comprise a read-write control circuit for the buffer memory A, a read-write control circuit for the buffer memory B, and a buffer memory selection circuit. The buffer memory selection circuit is used to generate a read-write selection signal for the buffer memory A and the buffer memory B so as to select read operation or write operation for the buffer memory A and the buffer memory B. The read-write control circuit for the buffer memory A is connected to the buffer memory A and used to implement a read operation or a write operation on the buffer memory A according to the read-write selection signal. The read-write control circuit for the buffer memory B is connected to the buffer memory B and used to implement a read operation or a write operation on the buffer memory B according to the read-write selection signal.

According to another aspect of the present invention, a method for generating dots of an image by using two error row memories is provided, wherein the image comprises rows of pixels, the two error row memories comprise a first buffer memory and a second buffer memory. The method comprises: reading an error accumulation value of a pixel to be processed out of the first buffer memory and meanwhile writing an error accumulation value to be stored of a pixel, on which error accumulation has been accomplished, in the second buffer memory; and reading an error accumulation value of a pixel to be processed out of the second buffer memory and meanwhile writing an error accumulation value to be stored of a pixel, on which error accumulation has been accomplished, in the first buffer memory.

Two error row memories are used in the device and method of generating dots of an image. The data can be read and written in parallel by using these two buffer memories, which improves the speed of generating dots significantly.

DESCRIPTION OF THE PREFERRED EMBODIMENTS

Hereinafter, embodiments of the present invention will be described in detail with reference to the appended drawings.

Circuits used for generating FM dots according to the present invention are described as follows.

According to the Error Diffusion method, an error of each pixel may be diffused to its adjacent pixels, in turn, each pixel may be influenced by errors diffused from its adjacent pixels. Therefore, a current pixel can be processed only after all of the pixels influencing the current pixel are processed.

Figure 1A:
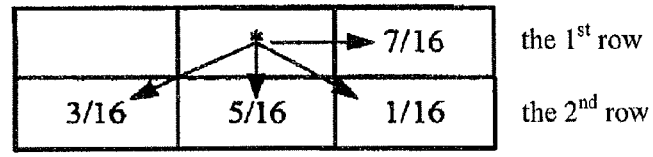
FIGS. 1A and 1B are diagrams illustrating error diffusion and distribution based on the Floyd-Steinberg Algorithm in the prior art.
Figure 1B:
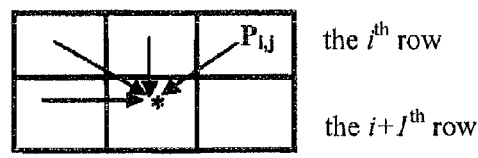

According to the Floyd-Steinberg Algorithm, an error of each pixel may be diffused to its four adjacent pixels. Thus, each pixel may be influenced by the errors diffused from its four adjacent pixels, as shown in FIG. 1B. For example, assuming that an image to be processed consists of pixels in n rows and m columns, errors diffused from the pixels in the $i-1^{th}$ row to the pixel $P_{i,j}$ can be calculated out once the pixel $P_{i-1, j+1}$ in the $i-1^{th}$ row is processed (in this disclosure, i denotes the row number and j denotes the column number of the pixel). Consequently, before all the pixels in the $i-1^{th}$ row are processed, a memory is needed to store an error accumulation value of the pixel $P_{i,j}$ caused by the related pixels in the $i-1^{th}$ row so that the error accumulation value of the pixel $P_{i,j}$ can be read out later for calculating a dot value of $P_{i,j}$ and errors diffused from $P_{i,j}$ to its adjacent pixels. The memory can be called an "error row memory", since the image consists of rows of pixels and the memory generally stores error accumulation values of pixels row by row. For example, an SRAM (Static Random Access Memory) can be used as the error row memory.

For calculating the dot value and error diffusion values of a current pixel, the final gray value of the current pixel may be obtained by adding together an original gray value of the current pixel, the error accumulation value of the current pixel caused by pixels in the previous row, which is read out of the error row memory, and the error diffused from the previous pixels in the current row to the current pixel. The obtained final gray value of the current pixel can be compared with a threshold so as to generate a dot for the current pixel and obtain errors diffused from the current pixel to its adjacent pixels. The errors diffused from each pixel to its adjacent pixels according to the Error Diffusion method are called "error distribution values".

The obtained error distribution values from the current pixel to its adjacent pixels should be temporarily stored, for being used in the processing of the pixels influenced by the errors diffused from the current pixel. An error distribution register file including register groups may be used to temporarily store the error distribution values. It can be understood that the number of the register groups may depend on the specific algorithm used. For example, three register groups are used to temporarily store the error distribution values from each pixel according to the Floyd-Steinberg Algorithm, which will be described in detail hereinafter.

Circuit elements used in an error diffusion circuit are described above. Hereinafter, an error diffusion device using the Floyd-Steinberg Algorithm in the prior art will be described with reference to FIG. 3.

Figure 3:
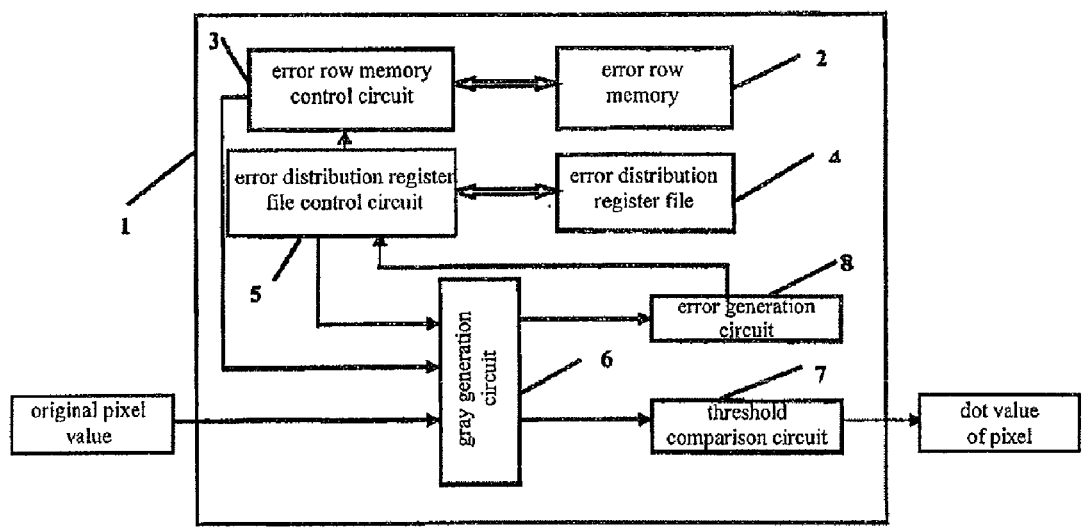
FIG. 3 is a diagram illustrating a error diffusion device based on the Floyd-Steinberg Algorithm in the prior art.

As shown in FIG. 3, an error diffusion device 1 comprises an error row memory 2, an error row memory control circuit 3, an error distribution register file 4, an error distribution register file control circuit 5, a gray generation circuit 6, a threshold comparison circuit 7 and an error generation circuit 8.

The error row memory control circuit 3 controls the read-write operations of the error row memory 2. Specifically, the error row memory control circuit 3 reads the error accumulation value of the current pixel $P_{i, j}$ out of the error row memory 2 and provides the error accumulation value for the gray generation circuit 6 for the calculation of the final gray value of the current pixel. In addition, the error row memory control circuit 3 calculates out the error accumulation value of the pixel $P_{i+1, j-1}$ by using the error distribution values output from the error distribution register file control circuit 5 and writes the error accumulation value of the pixel $P_{i+1, j-1}$ in the error row memory 2.

Figures 4, 5:
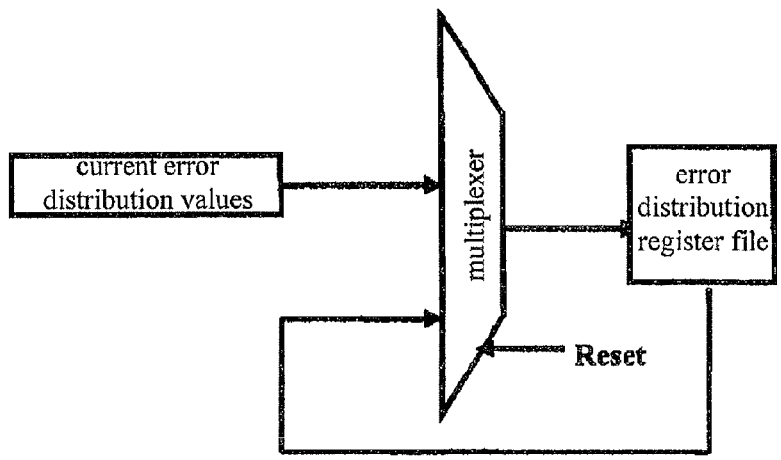
FIG. 4 is a diagram illustrating an error distribution register file control circuit comprising a multiplexer.
FIG. 5 is a diagram illustrating the configuration of the error distribution register shown in FIG. 3.

The error distribution register file control circuit 5 may be used to control the shift, update and clear operations of the error distribution register file 4. Specifically, the error distribution register file control circuit 5 may be used to temporarily store error distribution values from the error generation circuit 8 into the error distribution register file 4 and to provide error distribution values for the error row memory control circuit 3 and the gray generation circuit for calculation. In one embodiment, the error distribution register file control circuit 5 can be a multiplexer. FIG. 4 illustrates the connection of the multiplexer to the error distribution register.

FIG. 5 illustrates the configuration of the error distribution register file 4. $P_{i,j}$ denotes the current pixel in the $i^{th}$ row and $P_{i, j-1}$ and $P_{i, j-2}$ denote the processed pixels previous to the current pixel. In FIG. 5, $E_{i,j}$ denotes the error to be diffused from the pixel $P_{i, j}$ and D1 to D4 denote error distribution coefficients, wherein D1=1/16, D2=3/16, D3=5/16 and D4=7/16. According to the Floyd-Steinberg Algorithm, since the $E_{i, j-1}$D4 and $E_{i, j-2}$D4 are useless for the calculation of the gray value of the next pixel $P_{i, j+1}$ and the error accumulation values of the pixels in the next row, the $E_{i, j-1}$D4 and $E_{i, j-2}$D4 are not necessary to be stored. The shade portions denote the error distribution values from three pixels, which are useful for the calculation of the error accumulation value of the pixel * as shown in FIG. 1B and provided for the error row memory control circuit 3 for the addition calculation.

The gray generation circuit 6 may be used for generating the final gray of the original pixel $P_{i, j}$. The final gray value=the original pixel value+the error accumulation value of the pixel $P_{i,j}$ output from the error row memory control circuit 3+the error distribution values to the current pixel $P_{i,j}$ from its previous pixels in the same row output from the error distribution register file control circuit 5. Therefore, the gray generation circuit 6 can comprise an adder. Inputs of the gray generation circuit 6 are connected with an original pixel gray output device, the error distribution register file control circuit 5 and the error row memory control circuit 3, respectively. An output of the gray generation circuit 6 is connected with the threshold comparison circuit 7 for generating dots and connected with the error generation circuit 8 for calculating error distribution values from the pixel.

The threshold comparison circuit 7 may be used to compare the final gray value generated by the gray generation circuit 6 with a threshold to generate a dot.

The error generation circuit 8 may be used to calculate out error distribution values from the current pixel by comparing the final gray value generated by the gray generation circuit 6 with a threshold. An input of the error generation circuit 8 may be connected to the gray generation circuit 6 and an output of the error generation circuit 8 may be connected to the error distribution register file control circuit 5.

Hereinafter, the read-write operation of the error row memory 2 in the prior art will be described with reference to FIGS. 3 and 6.

The error row memory and the error distribution register file are initialized to 0. Then, the pixels are processed one by one from the first column and the first row. Since the error row memory and the error distribution register file have been initialized to 0, the final gray value of the pixel $P_{1,1}$ in the first column and the first row is equal to the read pixel gray value. Once the error distribution values from $P_{1,1}$ to its adjacent pixels are calculated out according to the final gray value of $P_{1,1}$, the error accumulation for the pixel $P_{2,0}$ in the $0^{th}$ column and the $2^{nd}$ row is accomplished. Since this value for the pixel $P_{2,0}$ is useless (the pixel $P_{2,0}$ is not an actual pixel in the image), this value is not necessary to be written in the error row memory.

Since there is no error diffused from the $0^{th}$ row to the $1^{st}$ row (there is no pixel in the $0^{th}$ row), each of the error accumulation values of all pixels in the $1^{st}$ row read out of the error row memory is the initialized value 0.

Figures 6, 7:
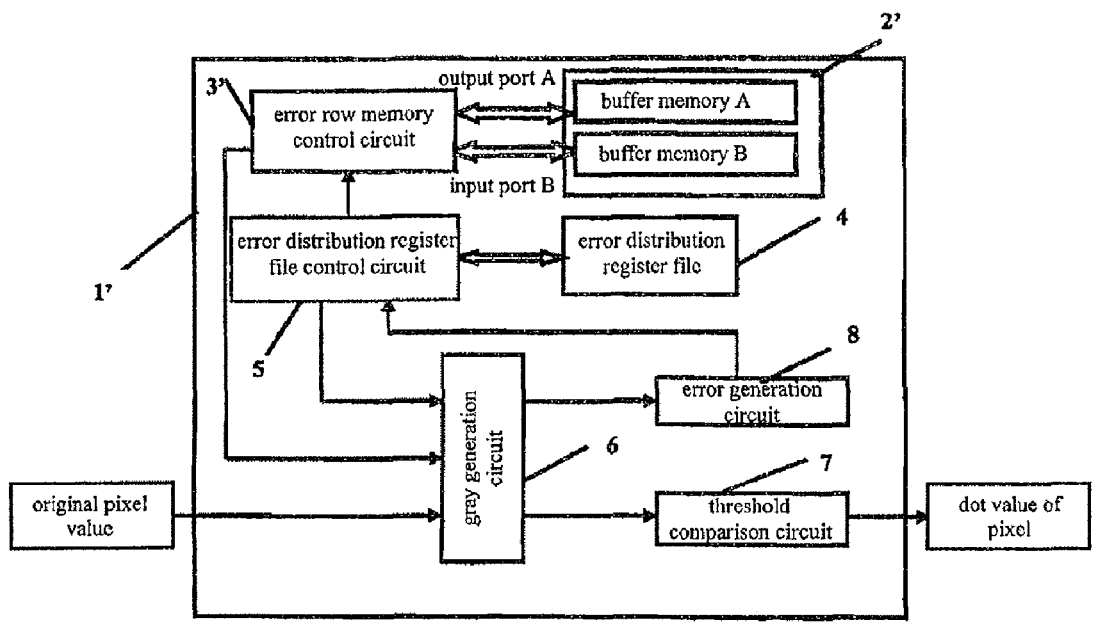
FIG. 6 is a diagram illustrating the read and write operations on a memory in several periods by using the error diffusion device shown in FIG. 3.
FIG. 7 is a diagram illustrating an error diffusion device according to the first embodiment of the present invention.

For the pixel $P_{i,j}$ in the $i^{th}$ row and $j^{th}$ column, in the first period, the error row memory control circuit 3 reads the error accumulation value $L_{i,j}$ of the pixel $P_{i,j}$ caused by the i–$1^{th}$ row out of the error row memory 2, as shown by "R" in FIG. 6. In the second period, the final gray value (=$P_{i,j}$+$L_{i,j}$+$E_{i,j-1}D_4$) and the dot value of the pixel $P_{i,j}$ are calculated out, according to the error distribution value $E_{i,j-1}D_4$ from $P_{i,j-1}$ to $P_{i,j}$ stored in the error distribution register file 4, as shown by "M" in FIG. 6. Meanwhile, the error distribution values from the pixel $P_{i,j}$ to its adjacent pixels are calculated out and stored in the register file. Since the error accumulation value of the pixel $P_{i+1,j-1}$ can be calculated out at this time, the error distribution values from $P_{i,j}$, $P_{i,j-1}$ and $P_{i,j-2}$ denoted by the shade portions in FIG. 5 can be added together to obtain the error accumulation value of the pixel $P_{i+1,j-1}$. In the third period, the error accumulation value of the pixel $P_{i+1,j-1}$ is written in the error row memory, as shown by "W" in FIG. 6.

It can be seen from FIG. 6 that "W" and "R" cannot arise in a same period. That is, the read operation and write operation of the memory are separately implemented for each pixel. Thus, as shown in FIG. 6, for four pixels, it needs four periods to process two pixels and eight periods are needed to process four pixels. Averagely, one pixel needs two periods.

Hereinafter, devices and methods for generating dots of an image by using two buffer memories as an error row memory according to the present invention will be described in detail.

Embodiment 1

The error diffusion devices and methods based on the Floyd-Steinberg Algorithm are described as follows.

As shown in FIG. 7, an error diffusion device 1' according to the present invention comprises an error row memory 2', an error row memory control circuit 3', an error distribution register file 4, an error distribution register file control circuit 5, a gray generation circuit 6, a threshold comparison circuit 7 and an error generation circuit 8. The identical components in FIGS. 3 and 7 have the same reference numerals, which will not be described in detail hereinafter.

Figure 8:
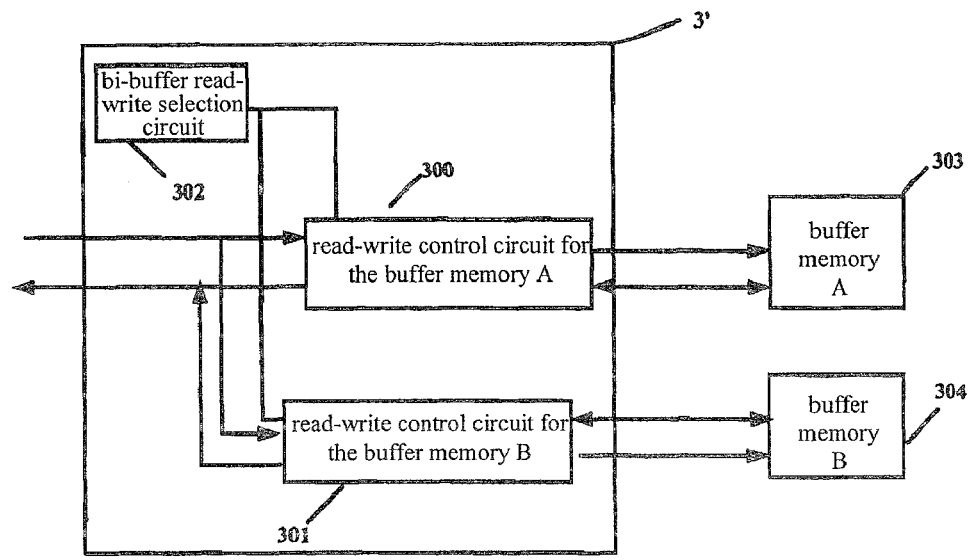
FIG. 8 is a diagram illustrating an error row memory control circuit in the device shown in FIG. 7.

As shown in FIG. 8, two buffer memories A and B are used as the error row memory 2' according to the present invention, which is different from the prior art. When the current row is an odd row, the error row buffer memory A is used to store the obtained error accumulation values and the error row buffer memory B is used to read the error accumulation values caused by the previous row; and when the current row is an even row, the error row buffer memory B is used to store the obtained error accumulation values and the error row buffer memory A is used to read the error accumulation values caused by the previous row; and vice versa. The error row memory control circuit 3' comprises a read-write control circuit 300 for the buffer memory A, a read-write control circuit 301 for the buffer memory B, and a bi-buffer read-write selection circuit 302, as shown in FIG. 8.

The read-write control circuit 300 for the buffer memory A is connected to the buffer memory A 303 and implements read and write operations on the buffer memory A 303. The read-write control circuit 301 for the buffer memory B is connected to the buffer memory B 304 and implements read and write operations on the buffer memory B 304. The bi-buffer read-write selection circuit 302 generates read-write selection signals for the two buffer memories according to the row number so that the read and write operations can be performed on the buffer memories A and B as selected, respectively.

The error row memory control circuit 3' implements read and write operations on the error row buffer memories A and B according to the selection of the bi-buffer read-write selection circuit 302. On one hand, when the current row is an odd row, the error row memory control circuit 3' reads the error accumulation value of the current pixel $P_{i,j}$ out of the error row buffer memory A and provides the error accumulation value of the current pixel $P_{i,j}$ for the gray generation circuit 6 for the calculation of the final gray value of the current pixel. In addition, the error row memory control circuit 3' calculates out the error accumulation value of the pixel $P_{i+1,j-1}$ in the next row by using the error distribution values output from the error distribution register file control circuit 5 and writes the obtained error accumulation value of the pixel $P_{i+1,j-1}$ in the error row buffer memory B. On the other hand, when the current row is an even row, the error row buffer memories A and B exchange their roles. Specifically, the error row memory control circuit 3' reads the error accumulation value of the current pixel $P_{i,j}$ out of the error row buffer memory B and provides the error accumulation value of the current pixel for the gray generation circuit 6 for the calculation of the final gray value of the current pixel. In addition, the error row memory control circuit 3' calculates out the error accumulation value of a corresponding pixel in the next row by using the error distribution values output from the error distribution register file control circuit 5 and writes the obtained error accumulation value of the corresponding pixel in the error row buffer memory A. It can be understood for the skilled in the art that the order of the read and write operations on the buffer memories A and B is not fixed. That is, for the current row, the buffer memory B can be used to output data and the buffer memory A can be used to input data. And then, for the next row, data are read out of the buffer memory A and written in the buffer memory B.

Figure 9:
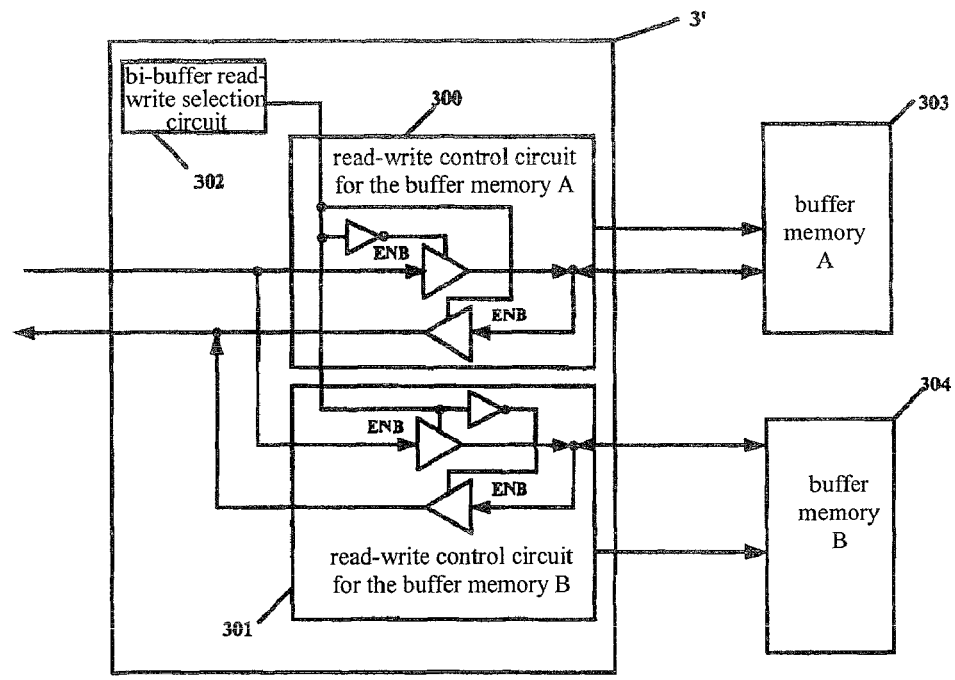
FIG. 9 is a diagram illustrating a buffer memory control circuit in the device shown in FIG. 8.

In an implementation, the bi-buffer read-write selection circuit 302 selects data paths through components, such as triple gates, inverters and the like, in the read-write control circuits for the buffer memories A and B so as to read/write the buffer memories A/B, as shown in FIG. 9.

The error row memory can be read and written in the same period by using the above-stated configuration so that the speed of error diffusion is improved.

Figures 10, 11:
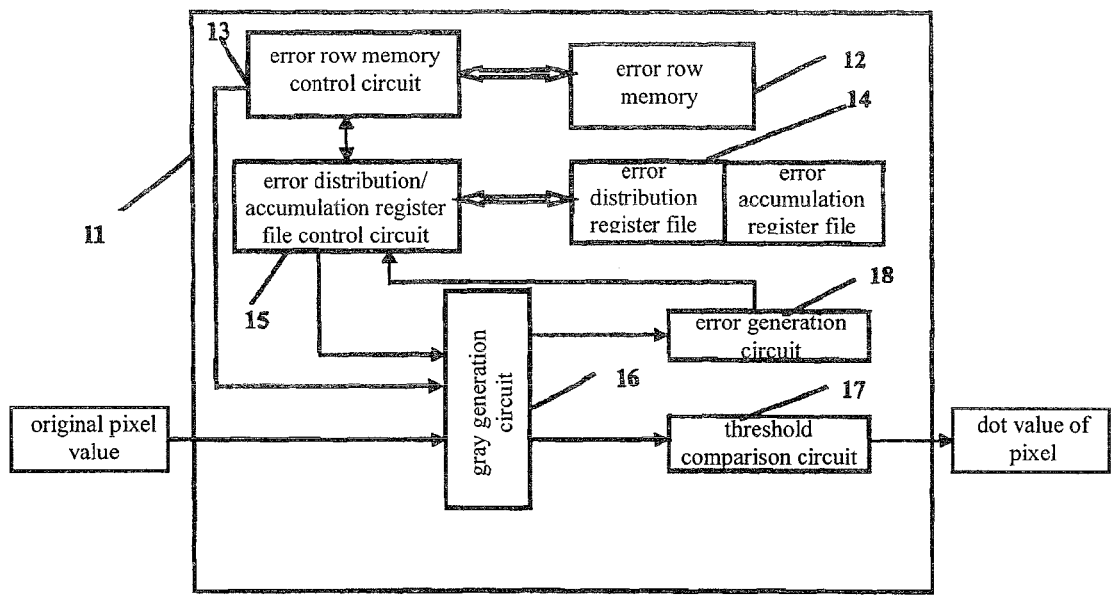
FIG. 10 is a diagram illustrating the read and write operations on a memory in several periods by using the error diffusion device according to the present invention.
FIG. 11 is a diagram illustrating a error diffusion device based on the Stucki Algorithm in the prior art.

FIG. 10 shows the read and write operations on the memory of the error diffusion device according to the present invention. As shown in FIG. 10, when the error accumulation value of the $3^{rd}$ pixel is being read, the error accumulation value of a pixel in the next row corresponding to the $1^{st}$ pixel in the current row can be written in the error row. Therefore, the read and write operations on the memories can be implemented in a same period. The process is as follow.

Firstly, the error row memory and the error distribution register file are initialized to 0.

In Step 1, the gray value of the first pixel $P_{1,1}$ to be processed in the first row is read and the error accumulation value of the pixel $P_{1,1}$ is read out of the error row memory (since the error row memory have been initialized to 0, the read error accumulation value is 0).

In Step 2, the final gray value of the pixel $P_{1,1}$ and the error distribution values from the pixel $P_{1,1}$ to its adjacent pixels are calculated out, according to the gray value and the error accumulation value of the pixel $P_{1,1}$ read out in Step 1 and error distribution values (which have been initialized to 0) at corresponding positions in the register file. Then, the register file is updated.

Meanwhile, the gray value of the second pixel $P_{1,2}$ to be processed in the current row is read and the error accumulation value of the pixel $P_{1,2}$ is read out of the error row memory.

In Step 3, the error accumulation value of the pixel $P_{2,0}$ on which the error accumulation has been accomplished is calculated out according to the error distribution values at corresponding positions in the register file. And then, the obtained error accumulation value of the pixel $P_{2,0}$ is written at a corresponding position in the error row memory. Since this error accumulation value of the pixel $P_{2,0}$ is useless, it may not be written in the error row memory.

Meanwhile, the final gray value of the pixel $P_{1,2}$ and the error distribution values from the pixel $P_{1,2}$ to its adjacent pixels are calculated out, according to the gray value and error accumulation value of the pixel $P_{1,2}$ read out in Step 2 and error distribution values at corresponding positions in the register file. Then, the register file is updated.

Meanwhile, the gray value of the third pixel $P_{1,3}$ to be processed in the current row is read and the error accumulation value of the pixel $P_{1,3}$ is read out of the error row memory.

It can be seen from the above that the read (R), write (W) and calculation (M) can be implemented at a same period in Step 3, which is different from the prior art.

Then, other pixels are processed similarly and sequentially. When the error accumulation value of the pixel $P_{i,j}$ is being read, the error distribution values from the pixel $P_{i,j-1}$ are being calculated and the obtained error accumulation value of the pixel $P_{i+1,j-3}$ is being written in a corresponding position in the memory. The pixels in the current row are processed similarly and sequentially until the final gray values of all pixels in the current row are calculated out and the error accumulation values of all pixels in the next row are calculated out and written in corresponding positions in the error row memory. Then, the register is cleared to 0 and pixels in the next row are started to be processed. The above process is repeated until pixels in all rows are processed.

As shown in FIG. 10, it only needs no more than six periods to process four pixels by using the method of the present invention.

Thus, it needs 2×N periods to process N pixels by using memories read and written separately, and needs only N+2 periods to process N pixels by using memories read and written in parallel. The latter can improve the speed of generating dots significantly.

Embodiment 2

The error diffusion devices and methods based on the Stucki Algorithm are described as follows.

Figure 2A:
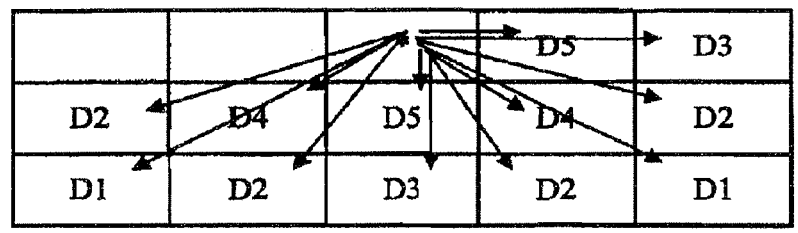
FIGS. 2A-2C are diagrams illustrating error diffusion and distribution based on the Stucki Algorithm in the prior art.
Figure 2B:
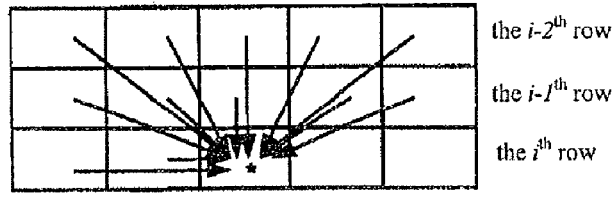

According to the Stucki Algorithm, at most, errors from the current pixel are diffused to the next two pixels in the current row and ten pixels in the next two rows, respectively. Thus, error diffusion values from the current row to the next two rows are required to be stored. In turn, each pixel may be influenced by ten pixels in the previous two rows and the previous two pixels in the current row at most, as shown in FIG. 2B. It can be understood that these influences cannot be obtained synchronously, but are obtained in batches as data are processed in rows. Therefore, it is needed to store the error accumulation values obtained in batches so as to calculate out the final gray values.

For example, for any pixel $P_{i,j}$, once the pixel $P_{i-2,j+2}$ in the i-$2^{th}$ row is processed, the error accumulation value of the pixel $P_{i,j}$ caused by all pixels in the i-$2^{th}$ row can be obtained, which is called a medium error accumulation value $L'_{i,j}$. The medium error accumulation value $L'_{i,j}$ should be stored in the error row memory before pixels in the i-$1^{th}$ row are processed. Then, once the pixel $P_{i-1,j+2}$ in the i-$1^{th}$ row is processed, the error accumulation value of the pixel $P_{i,j}$ caused by all pixels in the i-$1^{th}$ row can be obtained. In this case, the stored medium error accumulation value $L'_{i,j}$ is read out of the error row memory and then added to the error accumulation value of the pixel $P_{i,j}$ caused by the i-$1^{th}$ row so as to obtain a total error accumulation value of the pixel $P_{i,j}$ caused by the i-$1^{th}$ and i-$2^{th}$ rows, which is called a final error accumulation value $L_{i,j}$.

Figure 2C:
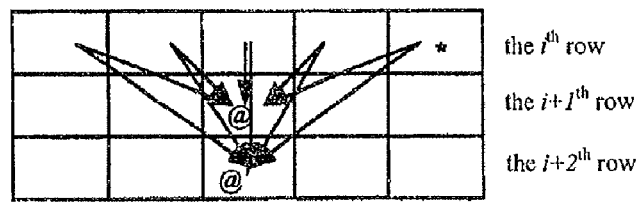

As shown in FIG. 2C, once the pixel $P_{i,j}$ is processed, the final error accumulation value $L_{i+1,j-2}$ of the pixel $P_{i+1,j-2}$ caused by the i-$1^{th}$ and i$^{th}$ rows and the medium error accumulation value $L'_{i+2,j-2}$ of the pixel $P_{i+2,j-2}$ caused by the i$^{th}$ row can be calculated out (*, @ and @' in FIG. 2C represent the pixels $P_{i,j}$, $P_{i+1,j-2}$ and $P_{i+2,j-2}$, respectively). For convenience, the final error accumulation value $L_{i+1,j-2}$ and the medium error accumulation value $L'_{i+2,j-2}$ can be stored as a packet in the error row memory. For calculating the final gray value of the pixel $P_{i+1,j-2}$ (@), the final error accumulation value $L_{i+1,j-2}$ of the pixel $P_{i+1,j-2}$ is needed to be read out of the error row memory. Since the medium error accumulation value $L'_{i+2,j-2}$ of the pixel $P_{i+2,j-2}$ (@') has been stored in the packet together with the final error accumulation value $L_{i+1,j-2}$ of the pixel $P_{i+1,j-2}$, it is also read out. However, the medium error accumulation value $L'_{i+2,j-2}$ can be used to calculate a final error accumulation value only after all error distribution values from pixels in the i+$1^{th}$ row to the pixel $P_{i+2,j-2}$ (@') are obtained. Therefore, it is required to temporarily store the read medium error accumulation value $L'_{i+2,j-2}$ in a register.

A register file called an error accumulation register file in this disclosure is provided to temporarily store a medium error accumulation value read out together with a final error accumulation value, which is used to calculate a final error accumulation value.

FIG. 11 illustrates an error diffusion device in the prior art by using the Stucki Algorithm. As shown in FIG. 11, the error diffusion device using the Stucki Algorithm is different from that using the Floyd-Steinberg Algorithm in that: the error row memory 12 stores the final error accumulation values and medium error accumulation values of pixels; an error distribution/accumulation register file 14 comprises the error distribution register file and a newly added error accumulation register file which is used to temporarily store medium error accumulation values read out of the error row memory 12; and an error distribution/accumulation control circuit 15 is used to control the error distribution/accumulation register file 14.

The pixel $P_{i,j}$ is processed by the device using the Stucki Algorithm as follows. The error row controller reads a packet including the final error accumulation value of the pixel $P_{i,j}$ and the medium error accumulation value of the pixel $P_{i+1,j}$ out of the error row memory, and temporarily stores the medium error accumulation value $L'_{i+1,j}$ of the pixel $P_{i+1,j}$ in the medium error accumulation value register. The medium error accumulation value $L'_{i+1,j}$ of the pixel $P_{i+1,j}$ is used to calculate the final error accumulation value of the pixel $P_{i+1,j}$ after the pixel $P_{i,j+2}$ is processed. Furthermore, the error row controller provides the final error accumulation value $L_{i,j}$ of the pixel $P_{i,j}$ the gray generation circuit for the calculation of the final gray value of the pixel $P_{i,j}$. Meanwhile, the error row memory control circuit calculates out the final error accumulation value of the pixel $P_{i+1,j-2}$ and the medium error accumulation value of the pixel $P_{i+2,j-2}$ and writes these obtained values as a packet in the error row memory.

Figure 12:
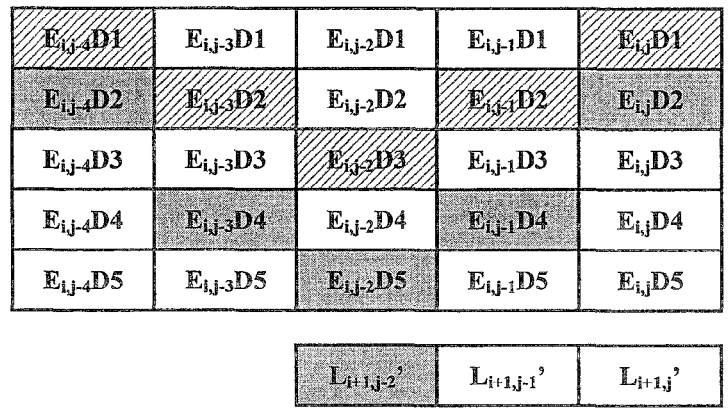
FIG. 12 is a diagram illustrating an error distribution/accumulation register file in the device shown in FIG. 10.

FIG. 12 illustrates the configuration of the error distribution/accumulation register file 14. For the current pixel $P_{i,j}$, in FIG. 12, E denotes the error to be diffused and D1 to D5 denote error distribution coefficients. The error distribution/accumulation register file control circuit 5 provides the data from the error distribution/accumulation register file 14 for the error row memory control circuit 13 as required. The error row memory control circuit 13 generates a write-in packet including the final error accumulation value $L_{i+1,j-2}$ of the pixel $P_{i+1,j-2}$ and the medium error accumulation value $L'_{i+2,j-2}$ of the pixel $P_{i+2,j-2}$, wherein $L_{i+1,j-2}=L'_{i+1,j-2}+E_{i,j}D2+E_{i,j-1}D4+E_{i,j-2}D5+E_{i,j-3}D4+E_{i,j-4}D2$ and $L'_{i+2,j-2}=E_{i,j}D1+E_{i,j-1}D2+E_{i,j-2}D3+E_{i,j-3}D2+E_{i,j-4}D1$. The shade portions directly denote the data used for calculating the two values.

Figure 13:
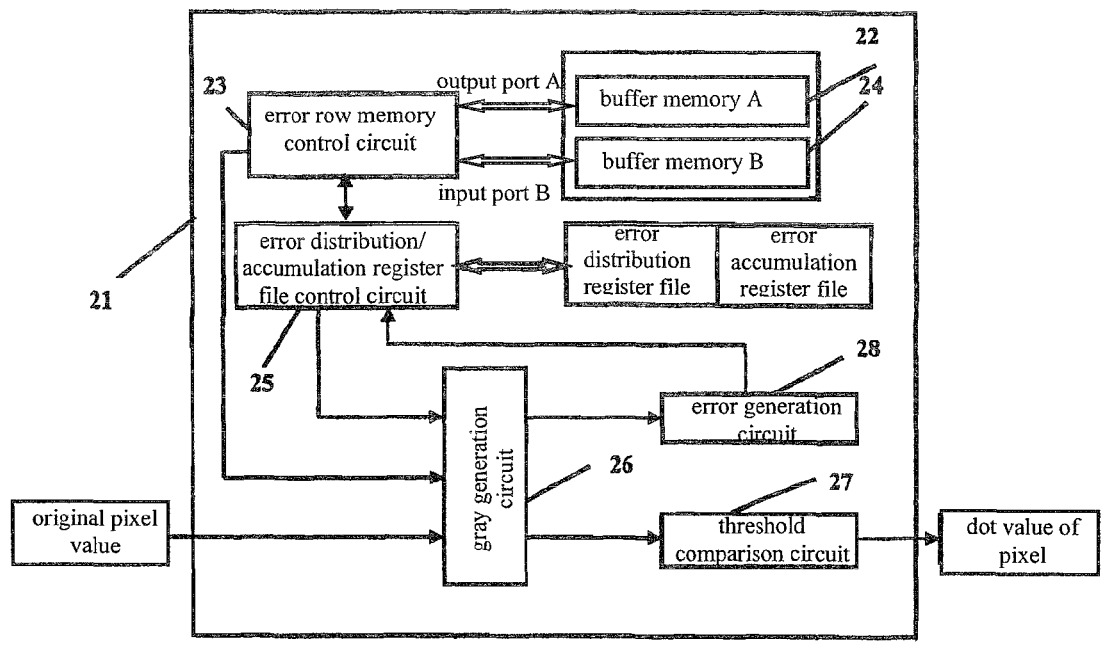
FIG. 13 is a diagram illustrating an error diffusion device according to the second embodiment of the present invention.

Similar to the first embodiment, two buffer memories are used as the error row memory in the error diffusion device based on the Stucki Algorithm according to the second embodiment of the present invention, as shown in FIG. 13, which is different from the prior art. The principle and configuration of the two buffer memories 22 and 24 are identical to those of the two buffer memories in the first embodiment of the present invention. The error row buffer memory A 22 and the error row buffer memory B 24 are controlled by the error row memory control circuit 23 so as to read and write the memory in parallel. By using two buffer memories, the processing speed of the error diffusion device can be improved significantly.

The process according to the second embodiment of the present invention is as follow.

Firstly, the error row memory and the error distribution/accumulation register file are initialized to 0.

In Step 1, the gray value of the first pixel $P_{1,1}$ to be processed in the first row is read, and the final error accumulation value of the pixel $P_{1,1}$ and the accumulated medium error accumulation value of the pixel $P_{2,1}$ (on which the medium error accumulation has been accomplished) are read out of the error row memory.

In Step 2, the final gray value of the pixel $P_{1,1}$ and the error distribution values from the pixel $P_{1,1}$ to its adjacent pixels are calculated out, according to the gray value and the final error accumulation value of the pixel $P_{1,1}$ read out in Step 1 and error distribution values at corresponding positions in the register file. Then, the error distribution values obtained by calculation and the medium error accumulation value of the pixel $P_{2,1}$ read out in Step 1 are temporarily stored in the register file so as to update the register file.

Meanwhile, the gray value of the second pixel $P_{1,2}$ to be processed in the current row is read and the final error accumulation value of the pixel $P_{1,2}$ and the accumulated medium error accumulation value of the pixel $P_{2,2}$ (on which the medium error accumulation has been accomplished) are read out of the error row memory.

In Step 3, the final error accumulation value of the pixel $P_{2,-1}$ on which the final error accumulation has been accomplished and the medium error accumulation value of the pixel $P_{3,-1}$ on which the medium error accumulation has been accomplished are calculated out, according to the error distribution values at corresponding positions in the register file and the medium error accumulation value of the pixel $P_{2,-1}$ (which has been initialized to 0). And then, the obtained final error accumulation value of the pixel $P_{2,-1}$ and medium error accumulation value of the pixel $P_{3,-1}$ are written at corresponding positions in the error row memory.

Meanwhile, the final gray value of the pixel $P_{1,2}$ and the error distribution values from the pixel $P_{1,2}$ to its adjacent pixels are calculated out, according to the gray value and final error accumulation value of the pixel $P_{1,2}$ read out in Step 2 and error distribution values at corresponding positions in the register file. Then, the error distribution values obtained by calculation and the medium error accumulation value of the pixel $P_{2,2}$ read out in Step 2 are temporarily stored in the register file so as to update the register file.

Meanwhile, the gray value of the third pixel $P_{1,3}$ to be processed in the current row is read and the final error accumulation value of the pixel $P_{1,3}$ and the medium error accumulation value of the pixel $P_{2,3}$ on which the medium error accumulation has been accomplished are read out of the error row memory.

It can be seen from the above that the read (R), write (W) and calculation (M) can be implemented at a same period in Step 3 by using two buffer memories.

Then, other pixels are processed similarly and sequentially. When the final error accumulation value of the pixel $P_{i,j+2}$ and the medium error accumulation value of the pixel $P_{i+1,j+2}$ are being read out, the error distribution values from the pixel $P_{i,j+1}$ are being calculated. Meanwhile, the final error accumulation value of the pixel $P_{i+1,j-2}$ and the medium error accumulation value of the pixel $P_{i+2,j-2}$ are being written in the error row memory, which are obtained according to the error distribution values and medium error accumulation value temporarily stored in the register file.

The pixels in the current row are processed similarly and sequentially until the final gray values of all pixels in the current row are calculated out and the final error accumulation values of all pixels in the next row and the medium error accumulation values of all pixels in the row next to the next row are calculated out and written in corresponding positions in the error row memory. Then, the register is cleared to 0 and pixels in the next row are started to be processed. The above process is repeated until pixels in all rows are processed.

Figure 14:
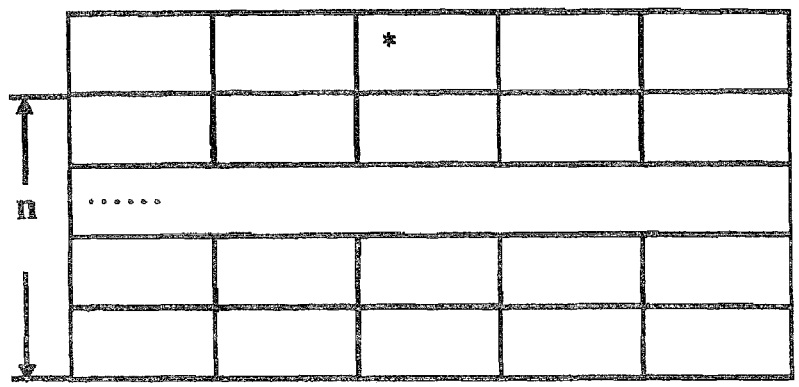
FIG. 14 is a diagram illustrating n rows influenced by an error diffused.
Figure 15:
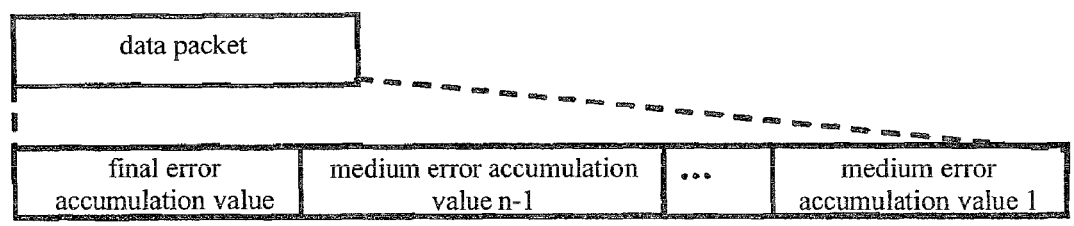
FIG. 15 is a diagram illustrating a packet including a final error accumulation value and medium error accumulation values.

It can be seen from the above embodiments two buffer memories are suitable for a method for processing an image based on the Error Diffusion, in which errors of a pixel will be diffused to more than two rows. For example, the device for generating dots of an image by using two error row memories disclosed herein can be used for the method for processing an image shown in FIG. 14, in which errors of a pixel will be diffused to n rows next to the pixel (n≧1). The two buffer error row memories are used to store data packets each including the final error accumulation value of a pixel and the medium error accumulation values of n−1 pixels under the pixel. FIG. 15 illustrates the configuration of a packet. An error accumulation/distribution register file is used to temporarily store the medium error accumulation values read out of the error row memories. In addition, the number of the registers may vary depending on the specific algorithm.

It can be understood for the skilled in the art from the above that the solution according to the present invention can be suitable for any device for generating dots of an image other than the devices stated above, which reads and writes the memories synchronously. For example, for any existing error diffusion device, if the method for processing an image diffuses errors from a pixel to a next row or next rows, a memory or memories are needed to store data of the processed pixels for the next pixel. The data may comprise the error accumulation value, the error distribution values, the final gray value of the processed pixel, the difference between the final gray value and a threshold, and the like. To improve the processing speed, two buffer memories can be used for storing. The two buffer memories may be connected to a memory controller which may read data out of one of the two buffer memories and write data in the other of the two buffer memories, so as to read and write synchronously.

The present invention is not limited to the descriptions and embodiments mentioned above. Variations and modification made by those skilled in the art according to the disclosure herein should be within the scope of the present invention.

The invention claimed is:

1. A device for generating dots of an image by using two error row memories, comprising:
   a first buffer memory;
   a second buffer memory; and
   a memory controller comprising:
      a first buffer memory read-write control circuit connected to the first buffer memory,
      a second buffer memory read-write control circuit connected to the second buffer memory, and
      a buffer memory selection circuit configured to generate a read-write selection signal for the first buffer memory and the second buffer memory so as to select a read operation or a write operation for the first buffer memory and the second buffer memory,
   wherein the first buffer memory read-write control circuit is configured to implement the read operation or the write operation on the first buffer memory according to the read-write selection signal and the second buffer memory read-write control circuit is configured to implement the read operation or the write operation on the second buffer memory according to the read-write selection signal;
   wherein the image comprises a plurality of rows of pixels, the device is configured to sequentially implement Error Diffusion from each pixel to pixels adjacent to the pixel, to diffuse errors of each pixel to a plurality of rows next to the pixel; and
   wherein the first buffer memory and the second buffer memory form the error row memories storing a final error accumulation value of a pixel in a row, on which a final error accumulation has been accomplished, and medium error accumulation values of pixels in n−1 rows next to the row, on which a medium error accumulation has been accomplished.

2. The device of claim 1, wherein the first buffer memory read-write control circuit comprises a triple gate and an inverter.

3. The device of claim 1, wherein the second buffer memory read-write control circuit comprises a triple gate and an inverter.

4. The device of claim 1, wherein a final error accumulation value and n−1 medium error accumulation values of pixels in a same column, which are obtained synchronously, are stored as a packet.

5. The device of claim 1, wherein the buffer memory selection circuit is configured to generate the read-write selection signal for the first buffer memory and the second buffer memory according to a row number.

6. The device of claim 5, further comprising a register, a register control circuit, a gray generation circuit and an error generation circuit,
   wherein the register is configured to temporarily store error distribution values from a pixel to pixels adjacent to the pixel and medium error accumulation values read out of the error row memories to calculate final error accumulation values;
   wherein,
      on one hand, if a current row is an odd/even row,
         the memory controller is configured to read a packet including a final error accumulation value and a medium error accumulation value out of the first buffer memory, provide the obtained final error accumulation value for the gray generation circuit, and temporarily store the medium error accumulation value in the register, and
         meanwhile, according to error distribution values and an medium error accumulation value in the register, the memory controller is configured to calculate out a final error accumulation value of a pixel on which final error accumulation has been accomplished and a medium error accumulation value of a pixel on which medium error accumulation has been accomplished, and write the obtained final error accumulation value and medium error accumulation value as a packet in the second buffer memory,
      on the other hand, if the current row is an even/odd row,
         the memory controller is configured to read a packet including a final error accumulation value and a medium error accumulation value out of the second buffer memory, provide the obtained final error accumulation value for the gray generation circuit, and temporarily store the medium error accumulation value in the register, and
         meanwhile, according to error distribution values and an medium error accumulation value in the register, the memory controller is configured to calculate out a final error accumulation value of a pixel on which final error accumulation has been accomplished and a medium error accumulation value of a pixel on which medium error accumulation has been accomplished, and write the obtained final error accumulation value and medium error accumulation value as a packet in the first buffer memory;

wherein the register control circuit is configured to temporarily store error distribution values from the error generation circuit in an error distribution register, temporarily store medium error accumulation values from the error row memories in an error accumulation register and provide error distribution values, which are used for calculation, for the memory controller and the gray generation circuit;

wherein the gray generation circuit is configured to generate a final gray value of each pixel; and wherein the error generation circuit is configured to generate error distribution values from pixels by calculation according to the final gray values generated by the gray generation circuit, and provide the obtained error distribution values for the error distribution register file control circuit.

7. A method for generating dots of an image by using two error row memories, wherein the image comprises a plurality of rows of pixels, the two error row memories comprise a first buffer memory and a second buffer memory, and the method comprises:

generating a read-write selection signal for the first buffer memory and the second buffer memory so as to select a read operation or a write operation for the first buffer memory and the second buffer memory;

implementing the read operation or the write operation on the first buffer memory and on the second buffer memory according to the read-write selection signal;

sequentially implementing Error Diffusion from each pixel to pixels adjacent to the pixel, to diffuse errors of each pixel to a plurality of rows next to the pixel; and storing, in the error row memories, a final error accumulation value of a pixel in a row, on which a final error accumulation has been accomplished, and medium error accumulation values of pixels in n−1 rows next to the row, on which a medium error accumulation has been accomplished.

* * * * *